United States Patent [19]

Berthold

[11] Patent Number: 5,226,730
[45] Date of Patent: Jul. 13, 1993

[54] INTERNAL TEMPERATURE MONITOR FOR WORK PIECES

[75] Inventor: John W. Berthold, Salem, Ohio
[73] Assignee: The Babcock & Wilcox Company, New Orleans, La.
[21] Appl. No.: 889,217
[22] Filed: May 27, 1992
[51] Int. Cl.$^5$ .................. G01K 11/24; G01K 11/22
[52] U.S. Cl. .................. 374/119; 374/117; 73/643
[58] Field of Search .......... 374/117, 119, 159; 73/643

[56] References Cited

U.S. PATENT DOCUMENTS

| | | | |
|---|---|---|---|
| 3,978,713 | 9/1976 | Penney | 374/7 |
| 4,137,991 | 2/1979 | Melcher et al. | 374/117 |
| 4,255,971 | 3/1981 | Rosencwaig | 374/117 |
| 4,448,547 | 5/1984 | Wickersheim | 374/131 |
| 4,469,450 | 9/1984 | DiVencenzo | 374/119 |
| 4,522,510 | 6/1985 | Rosencwaig et al. | 374/5 |
| 4,560,286 | 12/1985 | Wickersheim | 374/131 |
| 4,626,110 | 12/1986 | Wickersheim et al. | 374/131 |
| 4,655,608 | 4/1987 | Goss et al. | 374/117 |
| 4,762,425 | 8/1988 | Shakkottai et al. | 374/117 |
| 4,853,694 | 1/1989 | Tomecek | 340/621 |
| 4,987,367 | 1/1991 | Ishikawa et al. | 324/227 |

FOREIGN PATENT DOCUMENTS 1227064 3/1971 United Kingdom .............. 374/119

OTHER PUBLICATIONS

Lynnworth, L. et al., "New Sensors for Ultrasound: Measuring Temperature Profiles," Materials Res. & Stds., vol. 10, No. 8 (Aug. 1970).
Tasman, H. et al., "The Ultrasonic Thermometer—construction, application, and operating experience," High Temperatures-High Pressures, vol. 4, No. 4, pp. 477-481 (1972).
"Development and Evaluation of a Workpiece Temperature Analyzer for Industrial Furnaces", DOE Report, Contract #FC07-89ID12830 (May 1990).
"Development and Evaluation of a Workpiece Temperature Analyzer for Industrial Furnaces", Task 1, Task 3, and Final Report, DOE Reports, Contract #FC07-891D12875 (Apr., 1991).

Primary Examiner—William A. Cuchlinski, Jr.
Assistant Examiner—Diego F. F. Gutierrez
Attorney, Agent, or Firm—Vytas R. Matas; Robert J. Edwards; Daniel S. Kalka

[57] ABSTRACT

A method and apparatus for measuring the internal temperature of a work piece comprises an excitation laser for generating laser pulses which are directed through a water cooled probe, and in an optical fiber, to a first surface of the work piece. The laser is of sufficient intensity to ablate the surface of the work piece, producing a displacement and a resulting ultrasonic pulse which propagates within the thickness of the work piece to an opposite surface. The ultrasonic pulse is reflected from the opposite surface and returns to the first surface to create a second displacement. A second continuous laser also shines its light through an optical fiber in the probe into the first surface and is used in conjunction with signal processing equipment to measure the time between the first and second displacements. This time is proportional to the time-of-flight of the ultrasonic pulse in the work piece which, with a known or detected thickness of the work piece, can be used to calculate the internal temperature of the work piece.

12 Claims, 4 Drawing Sheets

INTERNAL TEMPERATURE MONITOR FOR WORK PIECES

This invention was made with Government support under Contract No. FC07-891D12875 awarded by the U.S. Department of Energy (DOE). The Government has certain rights in this invention.

BACKGROUND OF THE INVENTION

1. Field of the Invention

The present invention relates in general to temperature monitors, and in particular to a new and useful method and apparatus of accurately measuring the internal temperature of a work piece, in particular a steel work piece, in a high temperature furnace.

2. Description of the Related Art

Measuring the internal temperature of steels and other work pieces would be very useful for reduction in, among other things, process energy cost, material wastage from scale, and reduced direct production labor cost.

In a reheat furnace, for example, the primary objective is to control steel temperature, but it is not possible using current methods to measure the internal temperature of hot steel. Some steel companies use thermocouples and radiation pyrometers to measure furnace ambient temperature and steel surface temperatures. These measurements are then used along with the steel thickness/volume and time as inputs to a mathematical model to predict internal steel temperature. The difficulty with this approach is that it requires calibration which, in turn, depends on furnace and burner configuration.

Efforts have been underway in recent years to use ultrasonic methods to measure internal temperatures of hot steel. Electromagnetic Acoustic Transducers (EMATs) may be used to contact the hot steel momentarily to send and receive ultrasonic pulses through the metal. Measurement of the pulse time-of-flight is related to the internal steel temperature. See, for example, U.S. Pat. No. 4,469,425. These methods are proven, but because good contact with coupling fluid is required, the methods are limited to relatively low temperatures. These methods are not viable for in-furnace measurement of hot steel at temperatures above 2000° F.

Optical techniques for measuring temperature are also disclosed in U.S. Pat. Nos. 4,448,547; 4,560,286; and 4,626,100.

SUMMARY OF THE INVENTION

According to the present invention, laser light is used to ablate one surface of a work piece which produces a surface displacement that in turn generates an ultrasonic pulse which propagates through the work piece to the opposite surface of the work piece. The ultrasonic pulse is then reflected back and returns to the first surface where again a surface displacement takes place. The time-of-flight of the ultrasonic pulse can be measured, for example, using a continuous laser and appropriate signal processing equipment, which accurately determines the time between the first and second displacement of the work piece surface. This time is used in conjunction with the measured of known thickness of the work piece to give time-of-flight. The time-of-flight is proportional to the internal temperature of the work piece which can be calculated using appropriately programmed microprocessor or computer equipment.

Accordingly, an object of the present invention is to provide a non-contact method and apparatus for accurately measuring the internal temperature of a work piece, in particular a metal work piece in a high temperature furnace, while using equipment which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
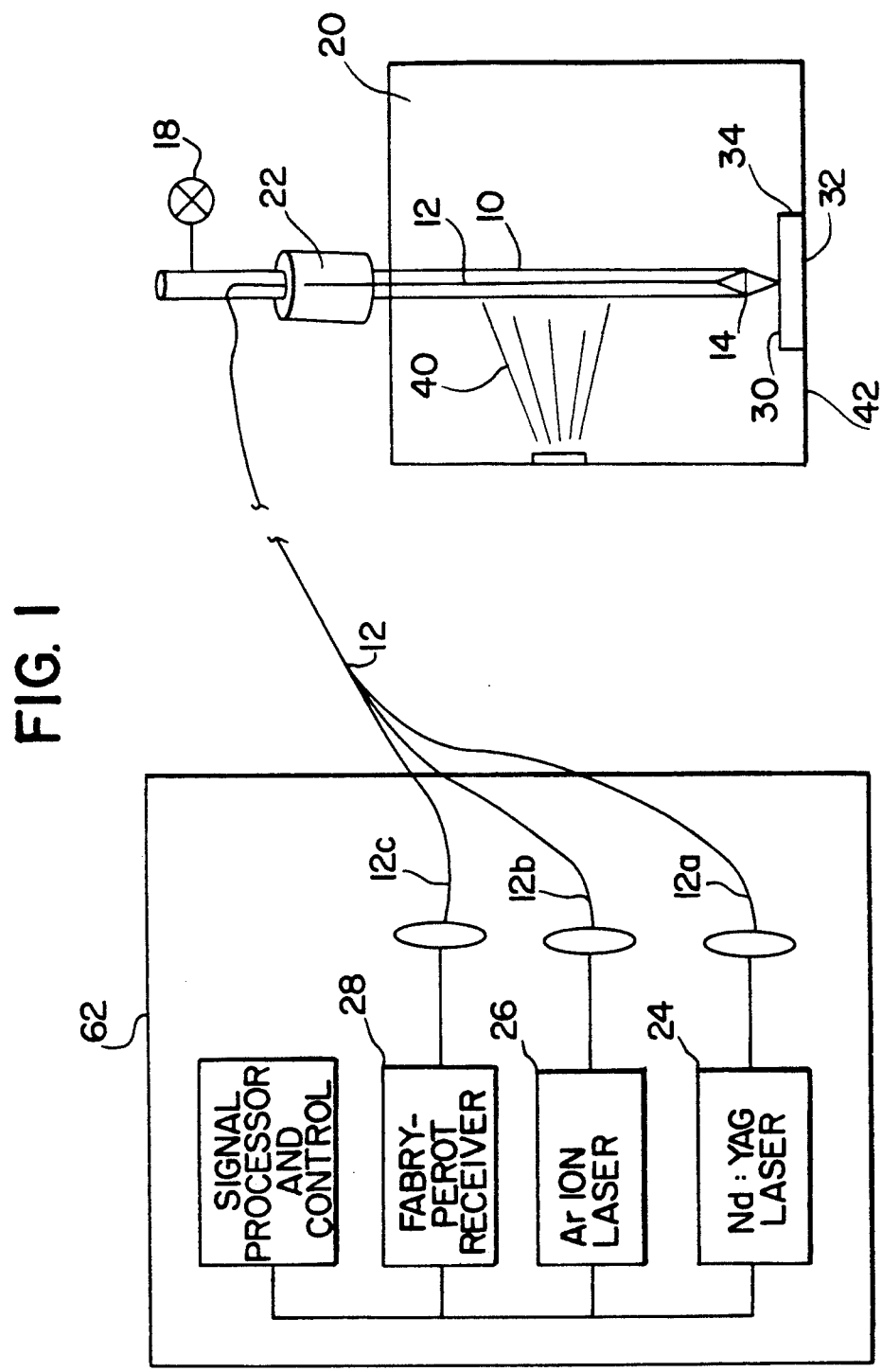
FIG. 1 is a schematic block diagram showing the apparatus of the present invention for measuring internal temperature in a work piece.

A work piece temperature analyzer of the invention is illustrated in FIG. 1, as it might be installed in a steel reheat furnace. A water-cooled probe (10) containing a fiber optic cable (12) and objective lens assembly (14) is inserted or retracted into a reheat furnace (20) with a motor drive (22). The probe allows excitation and probe light from two lasers (24, 26) to be delivered inside a protected glass transmission medium (fiber optics) to within a few inches of the work piece surface (30). Air turbulence and flames, symbolized at (40), in the furnace (20) could cause beam deflections or phase disruption. These problems with free light beams are avoided with the water-cooled probe (10).

Excitation laser (24) (Nd:YAG) produces short, intense light pulses which are coupled into one of the fibers (12a) in the cable (12). These pulses exit the other end of the fiber at the probe and are focused onto the work piece by optics (14). If these pulses exceed $10^7$ w/cm$^2$ intensity, a small amount of the work piece surface is ablated and vaporized. The resulting reaction force causes momentum transfer into the material and creation of a longitudinal ultrasonic wave. Short (~10 ns) laser pulses create wide spectrum ultrasonic pulses. These pulses propagate to the opposite surface (32) of the work piece at (34), and reflect from this surface if there is high impedance mismatch between the work piece and the material on which it rests, that is the furnace floor or a work piece support (42). The reflected ultrasonic pulse or echo, propagates back to the original surface (30) where it causes a small surface displacement. Measurement of the time-of-flight of the ultrasonic pulse (echo) enables determination of the average internal temperature of the work piece (34) along the propagation path of the echo.

The average internal work piece temperature is given by the following equation:

$$T_{av} = \left[\frac{2d(T)}{t} - v(T_o)\right] m^{-1}$$

d(T) = work piece thickness, which varies with temperature because of thermal expansion t = time-of-flight of ultrasonic pulse echo $\gamma(T_o)$ = velocity of sound through work piece at a known temperature $T_o$ m = linear slope of sound velocity vs. temperature Thus, determination of the average internal temperature of the work piece requires prior knowledge of the work piece thickness, thermal expansion coefficient, and sound velocity vs. temperature. These quantities are straightforward to measure independently, so that with a precise time-of-flight measurement $T_{av}$ may be determined.

To obtain the time-of-flight of the echo, a second Ar ion laser (26) is used along with a Fabry-Perot receiver (28). This Ar probe laser operates continuously, and after traveling through a second fiber (12b) in the fiber optic cable (12), the Ar beam shines on the work piece surface (30) at the same position as the excitation pulse from the Nd:YAG laser (24). When the excitation pulse ablates the work piece surface, a measurable surface displacement occurs, and when the pulse echo arrives back at the surface, a second measurable surface displacement occurs. Precision measurement of the time between these surface displacements is the ultrasonic pulse echo time-of-flight.

The surface displacements cause a Doppler shift, or time dependent optical phase shift on the Ar laser light scattered by the surface. This scattered light is collected by the objective lens (14) in the probe (10) and coupled into a third optical fiber (12c) in the cable (12).

Figure 2:
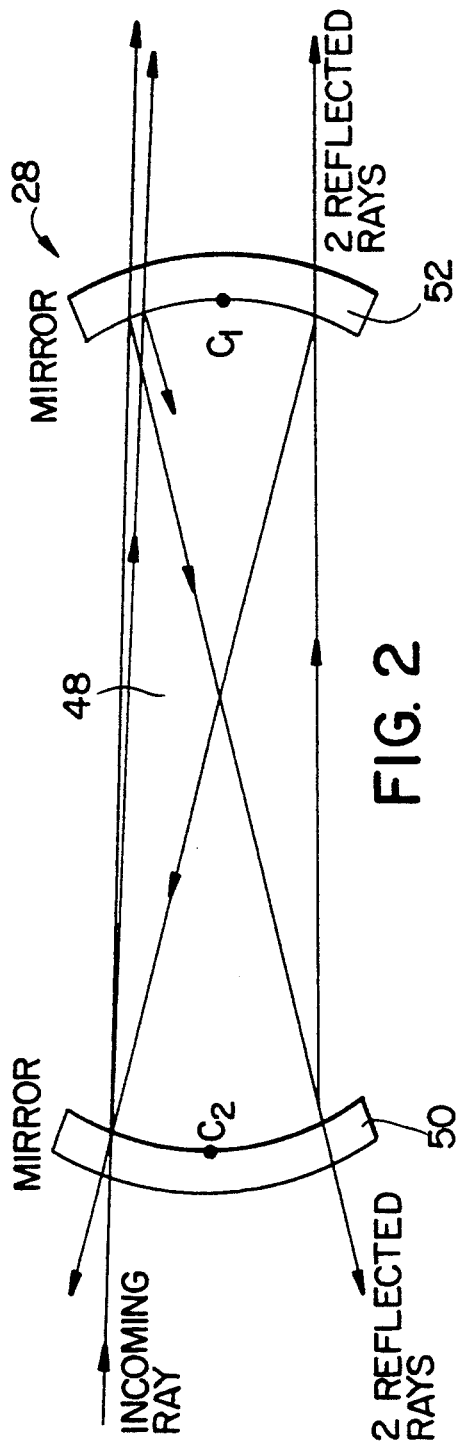
FIG. 2 is a schematic representation of the optical portions of a Fabry-Perot receiver for use with the method of the invention.
Figure 3:
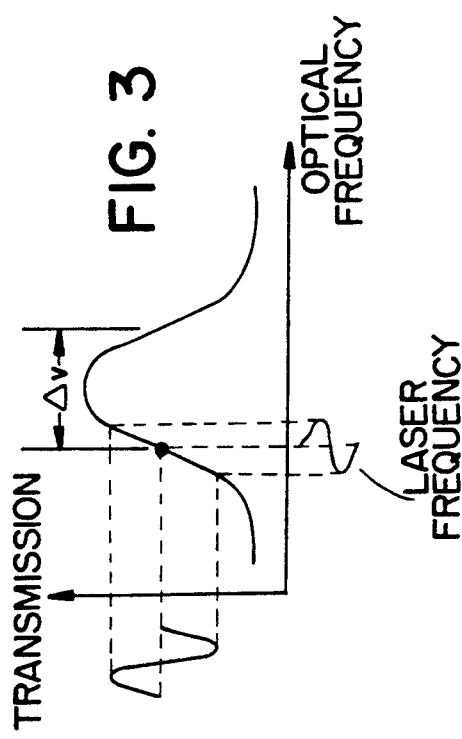
FIG. 3 is a graph illustrating the optical pass band produced by the optical parts of the Fabry-Perot receiver.

The output of the third optical fiber is coupled to the Fabry-Perot receiver (28). The Fabry-Perot receiver is an optical resonant cavity (48) consisting of two curved mirrors (50, 52) separated by their radius of curvature $C_1$ and $C_2$ as shown in FIG. 2. The optical pass band is shown in FIG. 3. If the Fabry-Perot is tuned so that the Ar laser operating frequency is at about one-half of the pass band maximum, then the light intensity transmitted through the Fabry-Perot increases with increasing optical frequency as shown. When surface displacement from the echo arrival occurs, the Doppler shifted light frequency is detected by the resulting change in transmitted light through the Fabry-Perot. A detector (56) (FIG. 4) converts the optical signal to an electrical signal. Appropriate signal processing (60) is used to clock the time between received signals and calculate the resulting internal work piece temperature $T_{av}$.

Figure 4:
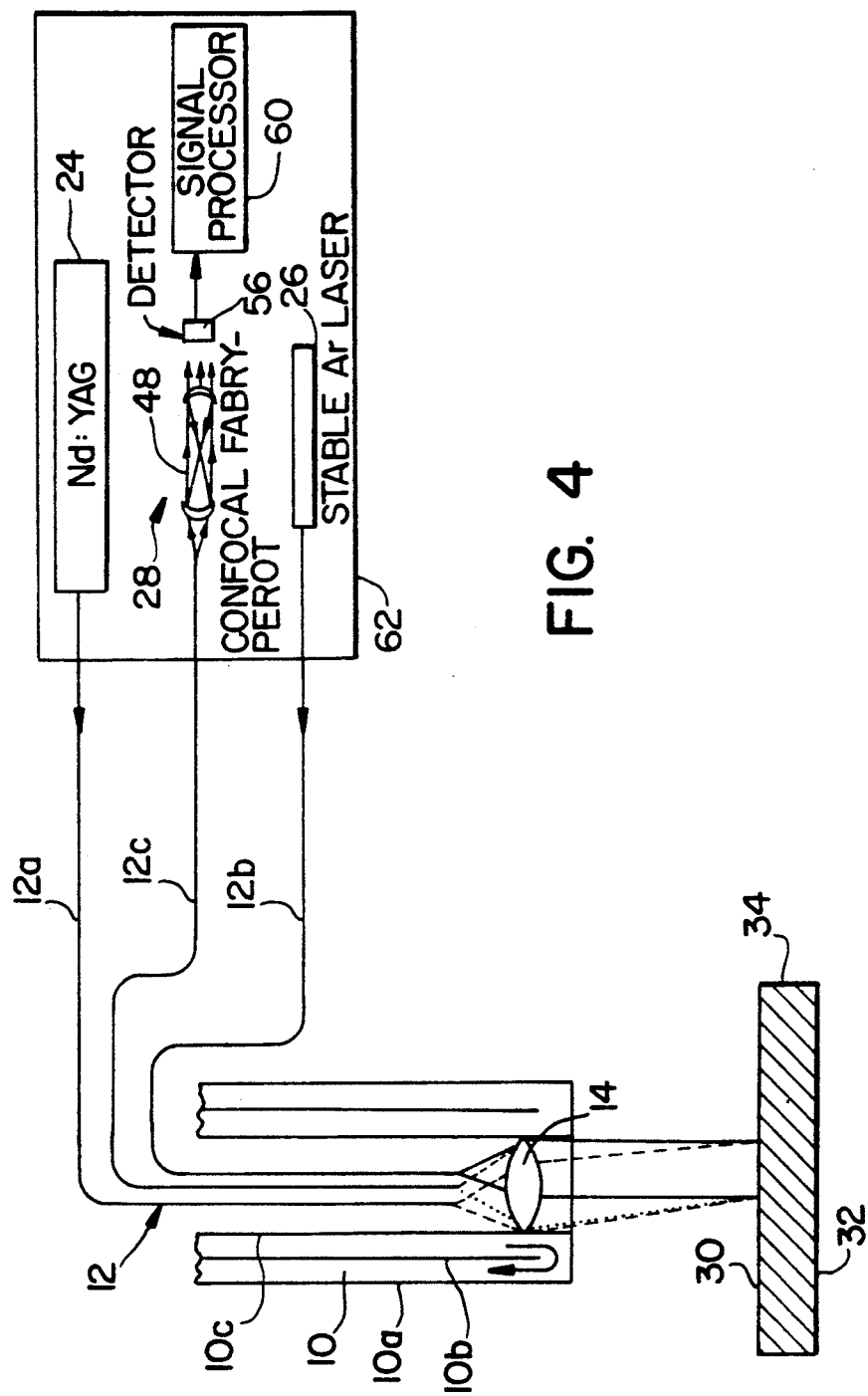
FIG. 4 is a partial block diagram of the apparatus of the invention in greater detail.

FIG. 4 shows more detail than the overall embodiment shown in FIG. 1, where the work piece temperature analyzer is set up for a reheat application. The same reference numerals designate the same, or functionally similar parts.

In order to cool probe (10), the probe is constructed to have an outer cylindrical wall (10a), an intermediate cylindrical wall (10b) and an inner cylindrical wall (10c) which form a pair of annular water passages that receive water from a cooling water circulator shown schematically at (18) in FIG. 1 and which circulates in the direction of the curved arrow near the lower end of the probe as illustrated in FIG. 4.

The equipment house (62) which contains the lasers and detection equipment, is advantageously placed at a considerable distance, for example 100 feet, from the furnace (20) which itself is a substantial construction, for example being 64 inches tall.

Figure 5:
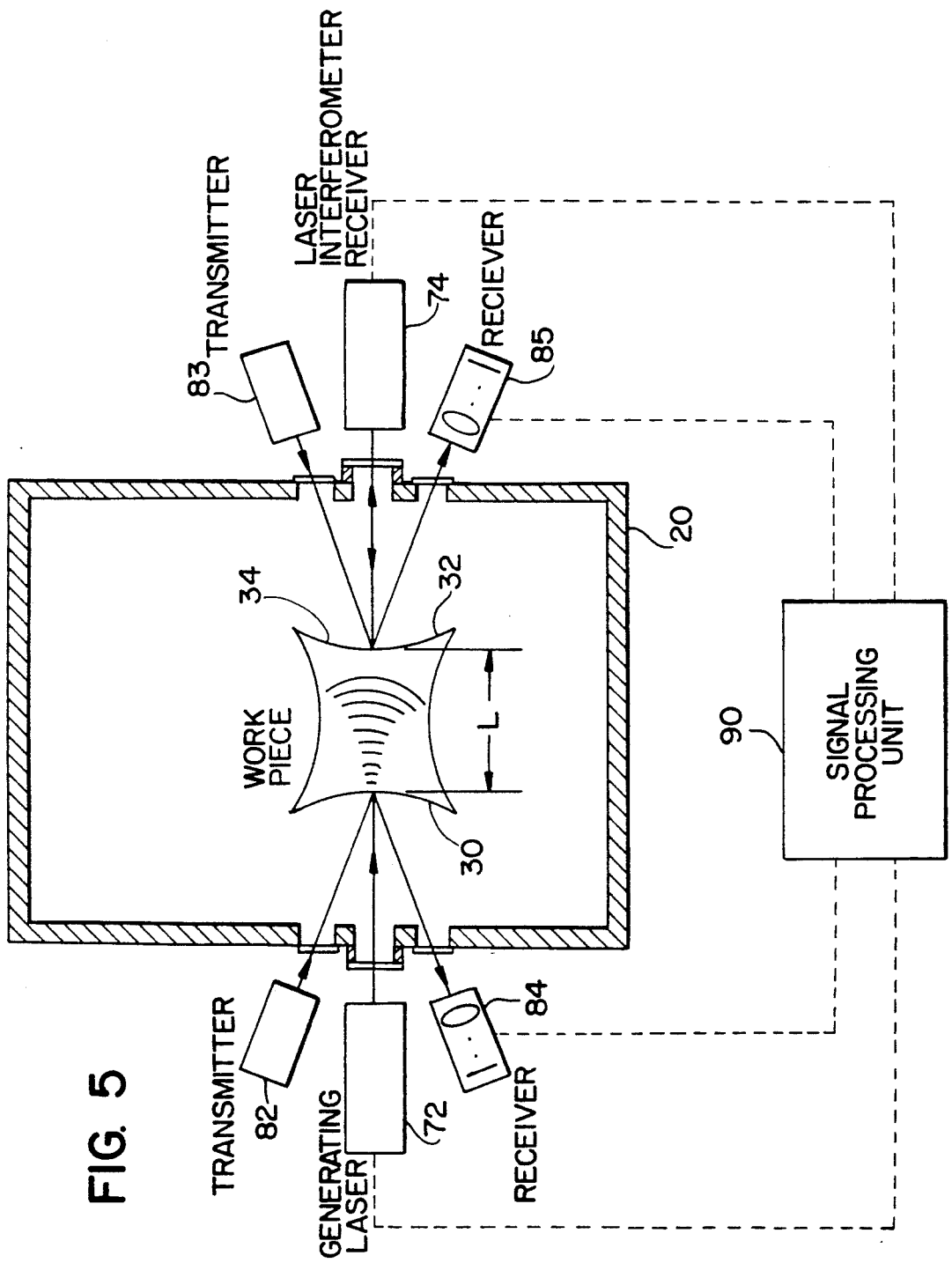
FIG. 5 is a schematic representation of a further embodiment of the invention.

FIG. 5 illustrates an embodiment of the invention which uses an optical triangulation system to measure work piece thickness. Also, location of the generation and detection lasers (72, 74) on opposite sides of the furnace (20) enable internal temperatures to be measured from the one-way propagation time of an ultrasonic pulse through the material. Triangulation is achieved using an optical triangulation transmitter (82, 83) on opposite sides of the work piece (34) to shine light on the opposite surfaces (30, 32) between the thickness L, which light is reflected and received by respective optical triangulation receivers (84, 85). Signals from the receivers are transmitted to and analyzed in a signal processing unit (90) which also controls the generating and interferometer receiver lasers (72, 74).

Advantages of the invention include:

Use of non-contact light beams to generate and detect ultrasound in materials inside furnaces such as steel at temperatures above 2000° F. Time-of-flight of ultrasound in steel is used to determine average internal temperature.

Benefits include reduced energy usage, reduced scale formation, and reduced direct labor for steel production.

Since non-contact operation is possible, all electronic and laser equipment may be located outside the furnace.

Several high power pulsed lasers could also be chosen for ultrasound generation. These include pulsed Nd:YAG or pulsed excimer lasers such as Xenon Chloride. Trade-offs include peak power requirements determined by steel thickness to be measured, and the need to transmit the generation laser light through optical fibers.

Several high sensitivity optical interferometers could be chosen for ultrasound detection. These include the Fabry-Perot interferometer, the Michelson interferometer and several types of polarization interferometers. Choices are diverse by sensitivity requirements and ruggedness of the interferometer for operation in industrial environments.

In the preferred embodiments of the invention, a Nd:YAG laser is chosen for its high peak pulsed power in the near infrared (1060 nm) where the light losses in optical fibers are low. To minimize nonlinear losses in the fiber during transmission of the high peak power Nd:YAG laser pulse, large fiber cores (1 to 1.5 mm diameter) could be used.

In the illustrated embodiment, a Fabry-Perot interferometer is chosen for ultrasound detection because these devices may be ruggedly constructed so that periodic alignments are not necessary. The invention has demonstrated sensitivities of $1.5 \times 10^{-14}$ m $(W)^{\frac{1}{2}}(Hz)^{-\frac{1}{2}}$ with this equipment.

The combination of high output power and frequency stability are important for the detection laser. In the illustrated embodiment, a frequency stabilized Argon ion laser is used.

While the specific embodiments of the invention have been shown and described in detail to illustrate the application of the principles of the invention, it will be understood that the invention may be embodied otherwise without departing from such principles.

I claim:

1. A method of measuring the internal temperature of a work piece in a furnace, the workpiece having a first surface, an opposite second surface and a predetermined thickness between the first and second surfaces, comprising the steps of:
   generating an excitation light pulse with a laser at a spaced location from the work piece;
   conveying the laser light pulse with an optical fiber extending in a cooled probe in the furnace up to a vicinity of the first surface of the work piece;
   striking the first surface with the pulse of excitation laser light to generate a first displacement at the first surface and form an ultrasonic pulse in the work piece which propagates to the second surface, the ultrasonic pulse being reflected at the second surface and returning to the first surface to produce a second displacement at the first surface;
   measuring the time between the first and second displacements which is proportional to a time-of-flight of the ultrasonic pulse in the work piece; and
   calculating the internal temperature of the work piece as a function of the predetermined work piece thickness and the time-of-flight.

2. A method according to claim 1, including the steps of measuring the time between the first and second displacements by striking the first surface with a second laser generating continuous laser light, conveying with a second optical fiber situated in the cooled probe the continuous laser light to the vicinity of the first surface of the workpiece to reflect the continuous laser light from the first surface of the workpiece, and analyzing light from the second laser reflected from the first surface to indicate the instants of the first and second displacements.

3. A method according to claim 2, including calculating the internal temperature according to the equation:

$$T_{av} = \left[ \frac{2d(T)}{t} - v(T_o) \right] m^{-1}$$

d(T) = work piece thickness, which varies with temperature because of thermal expansion
t = time-of-flight of ultrasonic pulse echo
$\gamma(T_o)$ = velocity of sound through work piece at a known temperature $T_o$
m = linear slope of sound velocity vs. temperature.

4. A method according to claim 3, including determining said predetermined thickness of the work piece between the first and second surfaces by shining light on the first and second surfaces, and analyzing the reflected light to determine the thickness of the work piece.

5. A method according to claim 2, including the steps of scattering the continuous laser light with the first and second displacements; collecting the reflected scattered continuous laser light with a third optical fiber situated in the cooled probe; and analyzing light from the continuous laser reflected from the first surface to indicate the instants of the first and second displacements.

6. A method according to claim 1, including calculating the internal temperature according to the equation:

$$T_{av} = \left[ \frac{2d(T)}{t} - v(T_o) \right] m^{-1}$$

d(T) = work piece thickness, which varies with temperature because of thermal expansion
t = time-of-flight of ultrasonic pulse echo
$\gamma(T_o)$ = velocity of sound through work piece at a known temperature $T_o$
m = linear slope of sound velocity vs. temperature.

7. A method according to claim 1, including determining said predetermined thickness of the work piece between the first and second surfaces by shining light on each of the first and second surfaces, receiving light reflected from each of the first and second surfaces, and analyzing the reflected light to determine the thickness of the work piece.

8. An apparatus for measuring the internal temperature of a work piece in a furnace, the work piece having a first surface, an opposite second surface and a predetermined thickness between the first and second surfaces, comprising:
   an excitation laser for generating laser pulses which are sufficiently intense to produce a displacement of a surface of the work piece;
   an optical fiber extending in a cooled probe in the furnace for conveying the excitation laser pulses to an immediate vicinity of the first surface, said cooled probe being positioned in the furnace near the work piece;
   lens means near the end of the optical fiber in the cooled probe in the vicinity of the first surface of the work piece for focusing the excitation laser pulses on the first surface to produce first displacements at the first surface, the first displacements each generating an ultrasonic pulse in the work piece which propagates to and reflects from the second surface, the ultrasonic pulses returning to the first surface to produce a second displacement at the first surface;
   time measuring means operatively engaged to the first surface of the work piece for measuring a time between the first and second displacements at the first surface which time is proportional to the time-of-flight of the ultrasonic pulse in a work piece; and
   calculation means connected to the time measuring means for calculating the internal temperature of the work piece as a function of the work piece thickness and the time of flight.

9. An apparatus according to claim 8, wherein the time measuring means comprises a second laser for generating continuous laser light, a second optical fiber situated in the cooled probe connected to the second laser for conveying the continuous laser light to the vicinity of the first surface of the work piece to reflect the continuous laser light from the first surface of the work piece, light collecting means for collecting reflected continuous laser light from the first surface of the work piece, and signal processing means for receiving and analyzing signals from the light collecting means to determine the time between the first and second displacements.

10. An apparatus according to claim 9, wherein the light collecting means includes a Fabry-Perot receiver to provide a pass band to transmit the collected light and a detector for detecting said light the detector being connected to the signal processing means.

11. An apparatus according to claim 10, wherein the excitation laser is a Nd:YAG laser and the continuous laser is an Ar ion laser.

12. An apparatus according to claim 9, further including a third optical fiber positioned in the cooled probe carrying the first and second optical fibers to the vicinity of the work piece, for collecting reflected scattered laser light from the continuous laser.

* * * * *